Aug. 20, 1940.   E. A. JOHNSTON   2,211,897
TRUCK CHAIN CONSTRUCTION
Filed Oct. 21, 1938   3 Sheets-Sheet 1
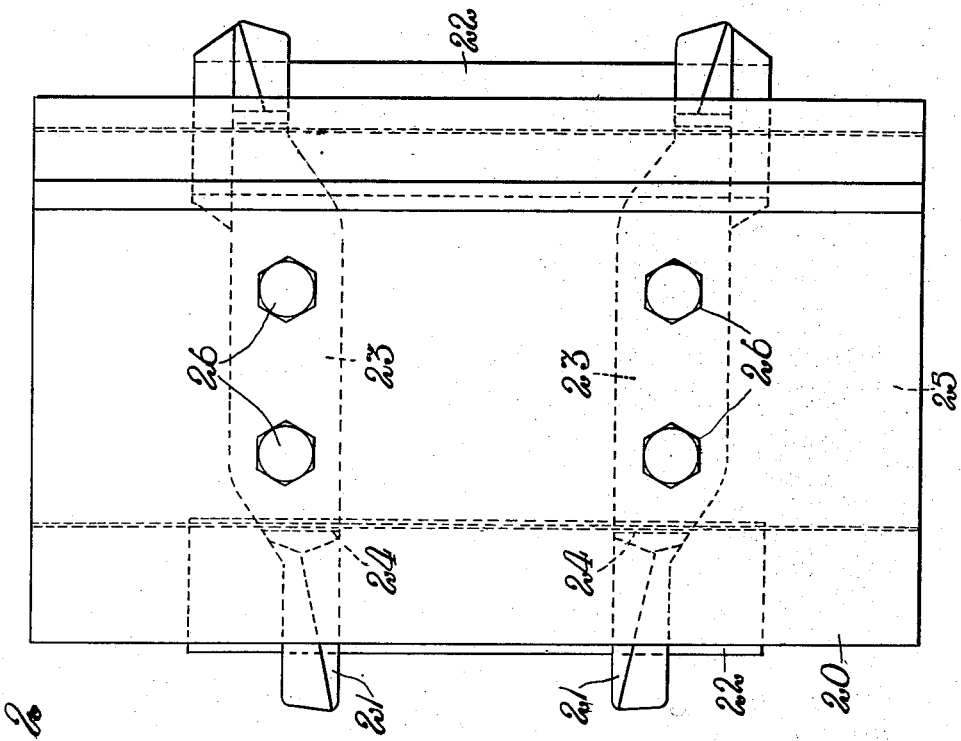
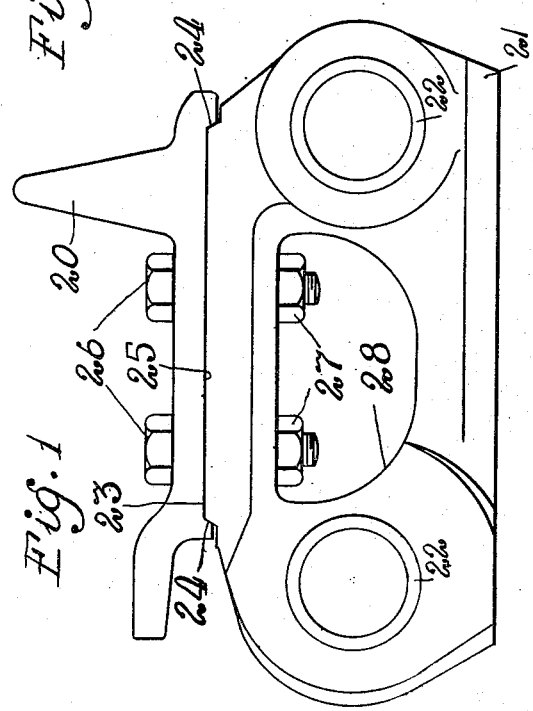
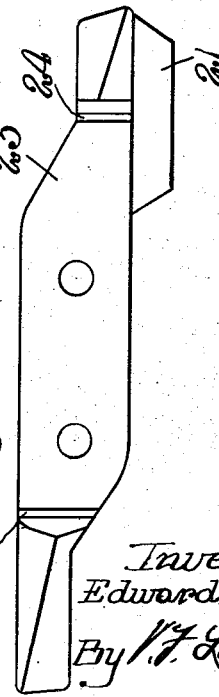
Inventor
Edward A. Johnston Aug. 20, 1940.　　　　E. A. JOHNSTON　　　　2,211,897
TRUCK CHAIN CONSTRUCTION
Filed Oct. 21, 1938　　　3 Sheets-Sheet 2
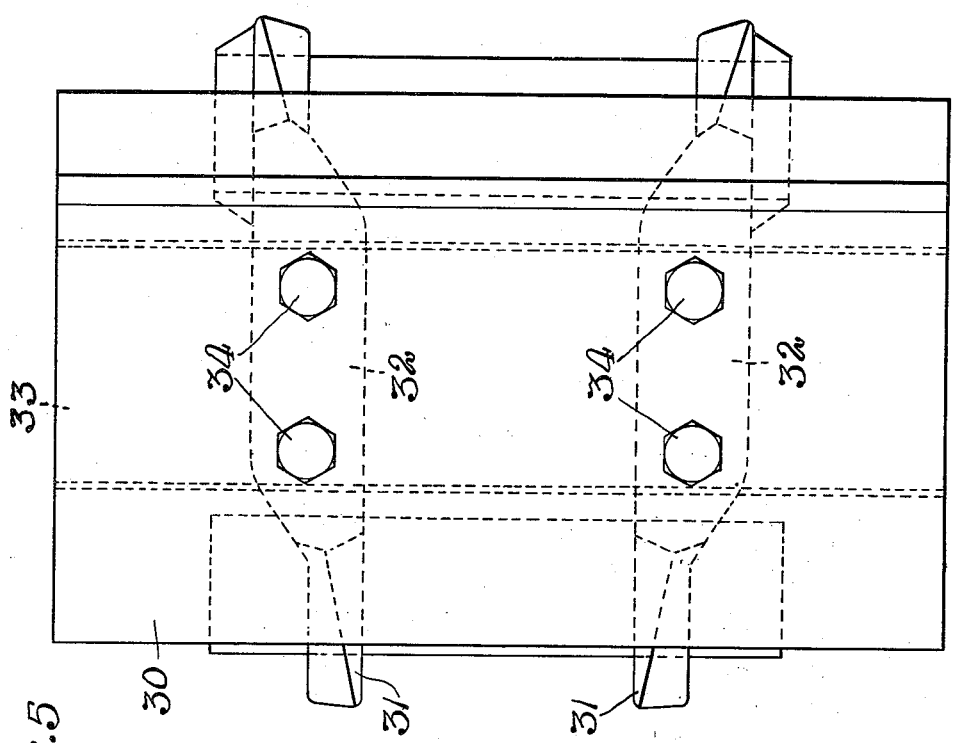
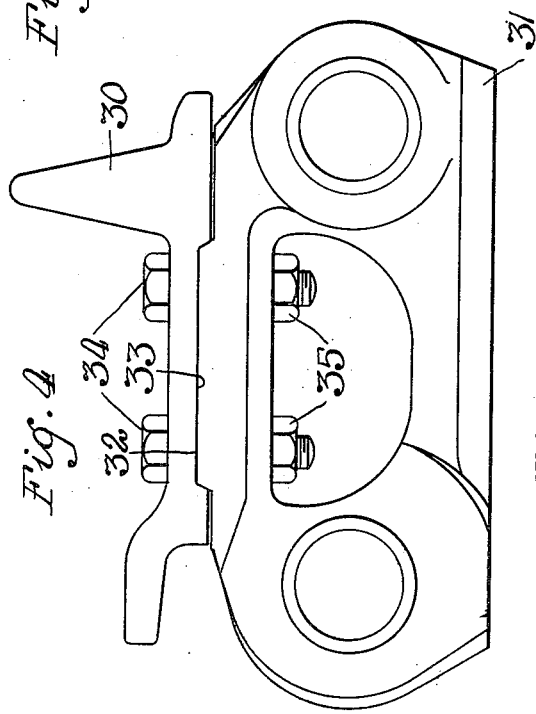
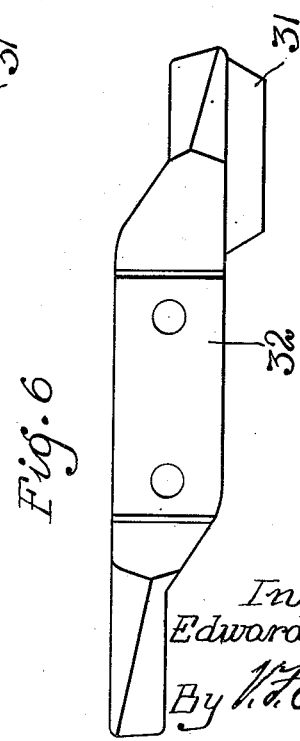
Inventor
Edward A. Johnston Aug. 20, 1940.  E. A. JOHNSTON  2,211,897
TRUCK CHAIN CONSTRUCTION
Filed Oct. 21, 1938  3 Sheets-Sheet 3
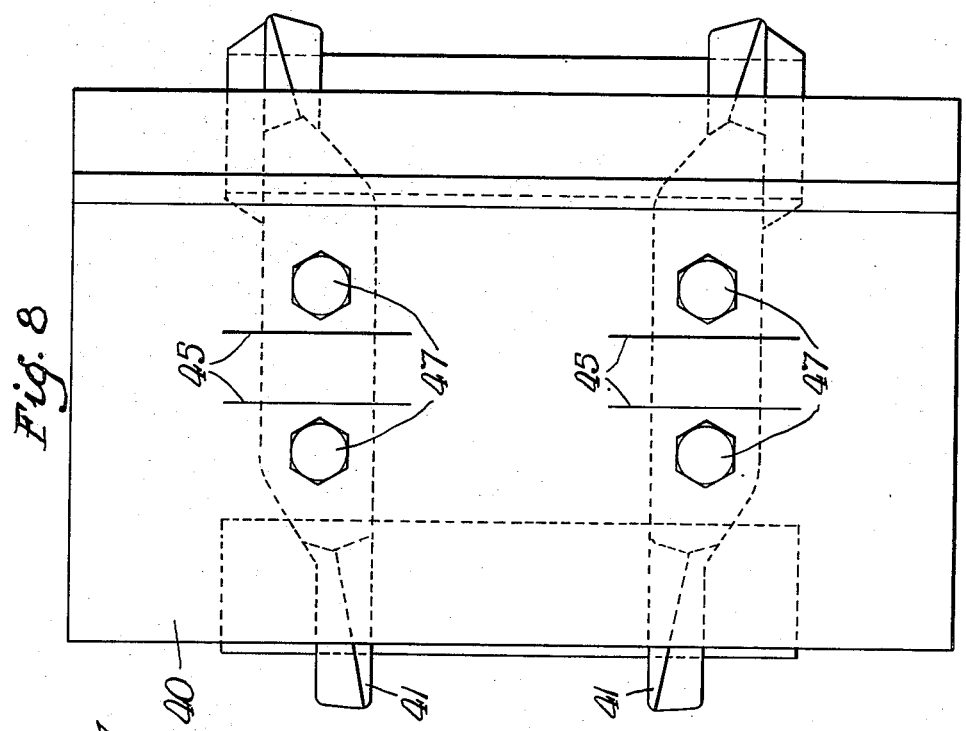
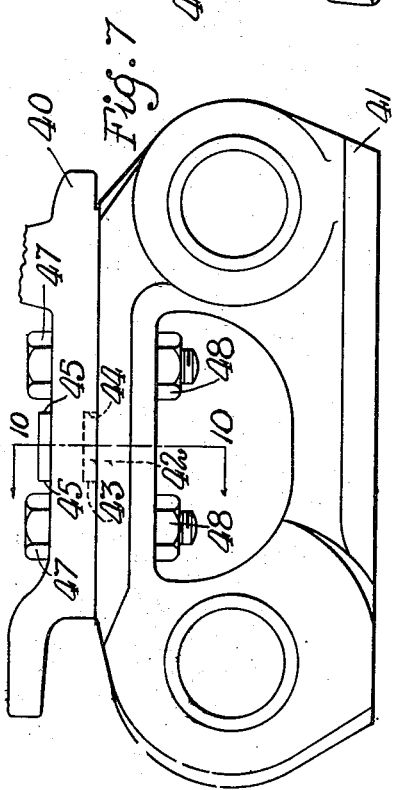
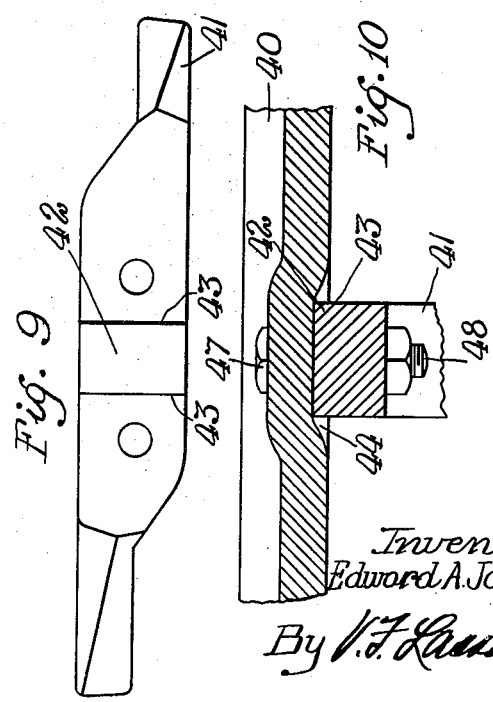
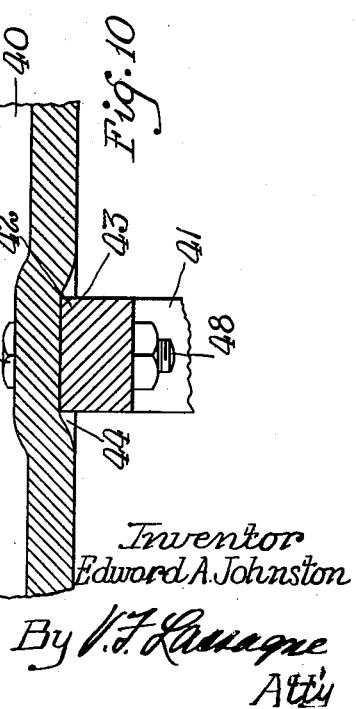
Inventor
Edward A. Johnston
By V. F. Lasagne
Att'y Patented Aug. 20, 1940

2,211,897

UNITED STATES PATENT OFFICE 2,211,897

TRACK CHAIN CONSTRUCTION

Edward A. Johnston, Chicago, Ill., assignor to International Harvester Company, a corporation of New Jersey Application October 21, 1938, Serial No. 236,273

3 Claims. (Cl. 305—10)

This invention relates to a track chain construction for track-laying tractors and more particularly to improved grouter and link assemblies comprising the chain construction.

The principal object of the invention is to provide, in a chain construction having spaced links, an improved means and manner of securing track shoes or grouters to said links.

An important object is to provide cooperating ribs and grooves, or keys and keyways, on the parts to prevent relative movement therebetween and to thereby eliminate strains and stresses on the bolts utilized to secure the parts together.

Still another object is to provide the links and grouters in a suitable fashion which facilitates manufacture and assembly.

Briefly and specifically, these and other important objects of the invention are achieved by the provision of a transverse rib on each of the links in a pair comprising a link assembly which is articulately interconnected with similar link assemblies to constitute the track chain for a tractor of the track-laying type. A track shoe or grouter is adapted to fit transversely across a pair of links and is provided with a transverse groove thereacross, fitting and cooperating with the transverse ribs on the links. A plurality of bolts is utilized to secure the grouter in place. The provision of the ribs and grooves and the cooperation therebetween prevents relative longitudinal movement between the links and grouter and consequently eliminates strains and stresses that otherwise would be imparted to the bolts.

A more complete understanding of the objects and desirable features of the invention may be had from the following detailed description taken in conjunction with the accompanying sheets of drawings, in which:

Figure 1 is a side elevational view of one preferred form of the improved construction;

Figure 2 is a plan view of the same;

Figure 3 is a plan elevational view of a single link member, showing the transverse rib or key portion;

Figures 4, 5 and 6 are similar views of another form of construction; and,

Figures 7, 8, 9 and 10 are similar views of another form, Figure 10 being a sectional view taken on the line 10—10 of Figure 7.

In the form shown in Figures 1, 2 and 3, a comparatively wide track shoe or grouter 20 is secured to a pair of transversely spaced and alined members 21. These link members are provided at opposite ends with transverse sleeves or bushings 22, which may be utilized in interconnecting the pair of links with other similar links comprising the self-laying track common to tractors of the track-laying type. Each link 21 is formed with a substantially flat or straight upper edge or surface, which is provided with a transverse rib or key portion 23. As best shown in Figures 1 and 3, the rib or key portion 23 in this form of the invention extends substantially the entire length of the upper edge of the link and is formed at opposite front and rear sides with sloping faces 24, which converge outwardly from the link. When the link members are assembled, as in Figure 2, the ribs 23 are in alinement transversely of the link members and chain assembly. The under side of the shoe 20 is substantially flat and has formed therein a transverse groove or keyway 25, the opposite front and rear sides or surfaces thereof being sloped or diverging toward the link.

When the shoe is disposed transversely across the upper edges of the links 21, the groove 25 engages and fits the ribs 23 on the links, the respective sloping end surfaces of the parts cooperating to prevent relative longitudinal movement between the parts. A pair of bolts 26 is passed through the shoe and each link and is secured to an under edge of the link by nuts 27 disposed in a cut-out portion of the link provided for the purpose, as at 28. It will be noted that the bolts are comparatively widely spaced longitudinally. This provision insures against undue loosening of the grouter caused by operation of the tractor or weaving of the track links as the track pins or bushings wear.

In another form of the invention shown in Figures 4, 5 and 6, a shoe or grouter 30 is associated with a pair of transversely spaced and alined link members 31, the parts being substantially similar to, and usable in the same instances as, the track chain parts previously described. In this form of the invention each link is provided with a transverse rib or key portion 32, which engages and cooperates with a transverse groove 33 formed in the flat under side of the grouter or shoe 30. In this instance the rib 32 is substantially longitudinally shorter than the rib 23 in the construction previously described. The opposite front and rear surfaces of the groove and ribs are similarly sloped and cooperate in the same manner as the corresponding parts previously referred to. The provision of the shorter rib provides for increased strength at opposite front and rear ends of the grouter and provides a suitable link and grouter assembly for use under adverse circumstances. A pair of bolts 34 is passed through the shoe and each link 31, being secured at an under edge of the link by a pair of nuts 35. These nuts are similarly widely spaced longitudinally.

In a further modified form shown in Figures 7, 8, 9 and 10, a shoe or grouter 40, somewhat similar to those afore-mentioned, is similarly associated with a pair of link members 41. Each link member has a substantially flat or straight upper edge formed with a transverse rib or key portion 42. This key portion has its opposite front and rear edges disposed substantially at right angles to the upper edge of the link, as at 43, to provide a positive driving rib or key, as will hereinafter appear. Each rib is substantially centrally disposed on the upper edge of the link and, when the links are assembled, the ribs are alined transversely of the link members and chain assembly.

The shoe or grouter 40 has formed therein a pair of transversely spaced, transversely extending grooves or keyway portions 44. These grooves are preferably formed by pressing portions of the shoe upwardly from the body of the shoe, thus separating the metal of which the shoe is formed along straight lines 45, thus forming opposite front and rear perpendicular surfaces, which cooperate respectively with the front and rear straight edges 43 formed on the ribs 42 of the links 41. These grooves, of course, are formed in the shoe at transversely spaced points corresponding to the spacing of the links and the positions of the ribs or keys thereon. The grooves are preferably formed by incompletely shearing the shoe upwardly, as described and as best shown in Figure 10. A pair of bolts 47 is passed through the shoe and each link 41, being secured at an under surface of the link by a pair of nuts 48. Each bolt in each link is disposed at one side of the interconnection between the rib 42 and the groove 44 in the link and shoe, respectively. A rigid connection between the shoe and the links is thus provided, the bolts being widely spaced longitudinally to prevent loosening of the shoe and relative movement between the shoe and links.

From the foregoing description it will be seen that the invention provides a new and improved shoe and link assembly, three preferred forms of which have been described. It will be appreciated that numerous other forms of the invention may be utilized and that numerous modifications and alterations may be made in the constructions illustrated and described without departing from the spirit and scope of the invention as defined in the appended claims.

What is claimed is:

1. In a track chain assembly, the combination of a pair of transversely spaced and alined links arranged longitudinally in the chain assembly, each link having a substantially straight upper edge formed with a transverse rib thereon, said ribs being alined transversely of the links, a shoe member carried by the links and having a pair of transverse portions pressed upwardly from the body of the shoe at transversely spaced points corresponding to the transverse spacing of the links to form grooves in the shoe respectively fitting the ribs on the links, and securing means for securing the shoe to the links.

2. In a track chain assembly, the combination of a pair of transversely spaced and alined links arranged longitudinally in the chain assembly, each link having a substantially straight upper edge formed with a transverse rib thereon substantially centrally thereof, a shoe member carried by the links and having a pair of transverse portions pressed upwardly from the body of the shoe at transversely spaced points corresponding to the transverse spacing of the links to form grooves respectively fitting the ribs on the links, and a pair of bolts passed through each link and the shoe respectively at each side of the rib and groove for securing the shoe to the links.

3. In a track chain assembly, the combination of a pair of transversely spaced and alined links arranged longitudinally in the chain assembly, each link having a substantially straight upper edge formed with a transverse rib therein, said ribs being alined transversely of the links, each of said ribs having its opposite front and rear sides straight and at right angles to the upper edge, a shoe member carried by the links and having a pair of transverse portions pressed upwardly from the body of the shoe at transversely spaced points corresponding to the transverse spacing of the links to form grooves in the shoe fitting the ribs on the links, each groove having front and rear straight sides tightly engaging the straight sides of a respective rib on a link, and securing means fastening the links to the shoe.

EDWARD A. JOHNSTON.